Feb. 28, 1967 D. G. W. INGRAM 3,306,979

PULSE CODE MODULATION SYSTEMS

Filed Feb. 18, 1963 4 Sheets-Sheet 1

INVENTOR
DEREK GEORGE WOODWARD INGRAM

BY Kurtz, Kurtz & Ollum [illegible]

ATTORNEYS

PULSE CODE MODULATION SYSTEMS

Filed Feb. 18, 1963 4 Sheets-Sheet 2

INVENTOR

DEREK GEORGE WOODWARD INGRAM

BY Kirschstein, Kirschstein & Ottinger

ATTORNEYS

INVENTOR
DEREK GEORGE WOODWARD INGRAM
BY Kinchlore, Kinchlore & Ottinger
ATTORNEYS Feb. 28, 1967 D. G. W. INGRAM 3,306,979

PULSE CODE MODULATION SYSTEMS

Filed Feb. 18, 1963 4 Sheets-Sheet 4

INVENTOR

DEREK GEORGE WOODWARD INGRAM

BY Kinzer, Kinzer & [illegible]

ATTORNEYS

United States Patent Office 3,306,979

Patented Feb. 28, 1967

3,306,979

PULSE CODE MODULATION SYSTEMS

Derek George Woodward Ingram, Wembley, England, assignor to The General Electric Company Limited, London, England Filed Feb. 18, 1963, Ser. No. 259,219
Claims priority, application Great Britain, Feb. 20, 1962, 6,544/62
14 Claims. (Cl. 179—15)

Figure 1:
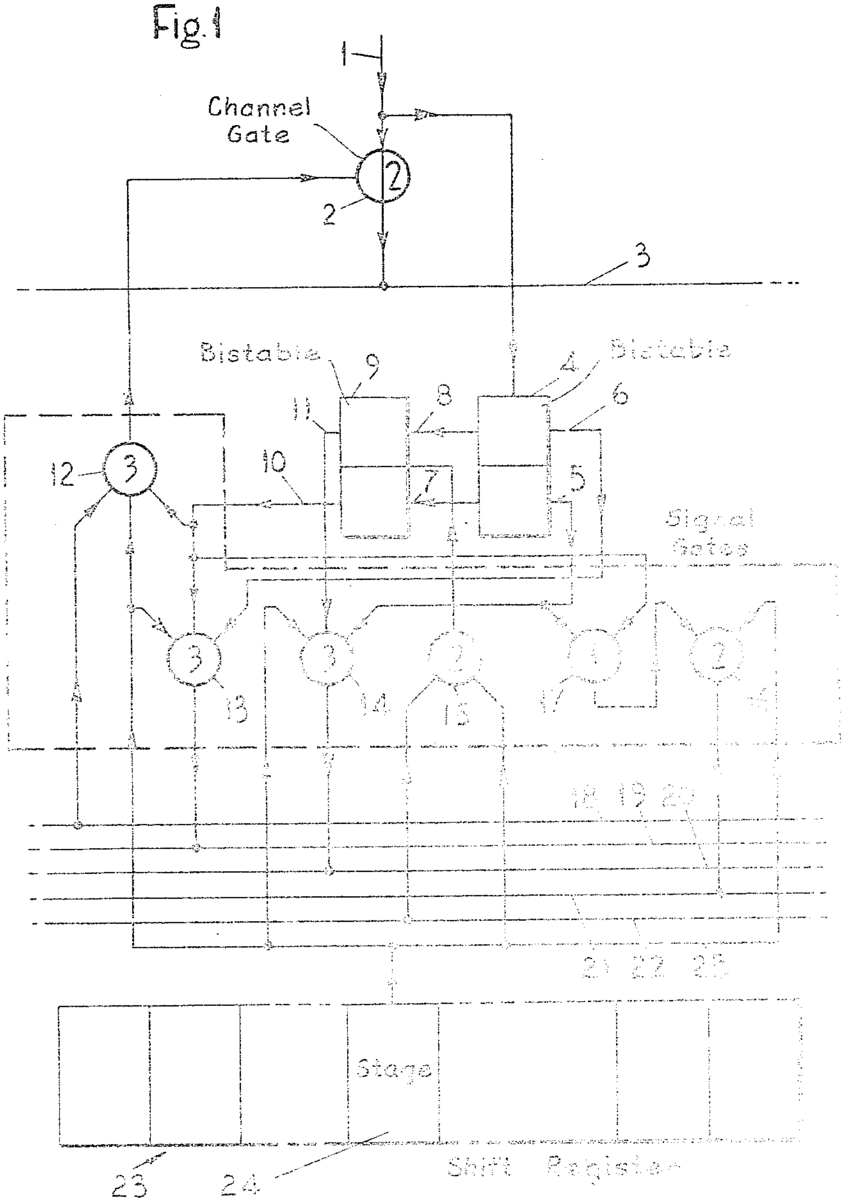

This invention relates to pulse code modulation systems.

In a known multi-channel pulse code modulation communicaiton system, equipment is provided at the transmitting terminal of the system whereby the amplitudes of the incoming audio frequency signals which are present on the various incoming channels are sampled at frequent, regularly-recurrent instants. Each of the sample voltages so obtained is then supplied to a part of the equipment commonly referred to as a coder, which operates to supply a code group of pulses which defines the polarity and the magnitude of the relevant sample voltage.

The signal transmitted from the transmitting terminal to the receiving terminal is then a pulse signal comprising these code groups of pulses combined in time multiplex, together possibly with other pulses which provide signalling and synchronising information. The signal transmitted may be considered as comprising a sequence of "frames" each of which includes one code group of pulses in respect of each of the incoming channels, the code groups in respect of the incoming channels occurring in the same sequence in each frame.

With this arrangement it will be appreciated that a code group of pulses will be included in each frame in the transmitted signal in respect of each incoming channel, irrespective of whether or not there is an audio frequency signal actually present on that channel at the instant of sampling.

Considering in particular the case in which the system outlined above is a telephone system; it is necessary to provide two channels to accommodate each telephone conversation which is in progress, one channel carrying the audio frequency signals in one direction, and the other channel carrying the audio frequency signals in the other direction. This means that even for a channel which is nominally in "active" use, that is, one which is in use to carry a telephone conversation, there will not, on average, be an audio frequency signal actually being transmitted over the channel for more than half the total time. In fact, the time for which each channel is in actual "active" use is even less than this, because even when an audio frequency signal is being transmitted over the channel, audio frequency signals will only be actually present for approximately half of the time, due to the silences between words and syllables in normal speech.

On average, therefore, each of the available channels is only in actual active use for approximately one quarter of the total time. This means that on average, at any given time, only about one quarter of the available channels are in actual active use, and each of the code groups transmitted in respect of the remaining channels is doing no more than indicating that at the relevant instant of sampling no audio frequency signal is present on that particular channel. This clearly is a waste of available capacity in the system, and it is an object of the present invention to provide a pulse code modulation system in which the effective capacity of the system is increased as compared with the system outlined above.

In the transmitting terminal of a pulse code modulation system in accordance with the present invention, the channel inputs are examined in rotation and the presence and absence of signals on each of these inputs at the current and last preceding examination are indicated respectively by a channel detector and a channel register. Thus, when a channel is in active use both the channel detector and the channel register indicate the presence of a signal on that channel input. In response to each such dual indication sampling means is caused to sample the amplitude of the signal on the appropriate channel input and this sample is coded by coding means. The coded sample is passed to signalling means which supplies as an output signal a code group of pulses defining that sample.

When an active channel becomes quiescent, i.e., the signal on its input ceases due either to the completion of communication over that channel or to a silence between words or syllables, the channel detector and the channel register respectively indicate the absence and presence of a signal on that channel input. Similarly, when a quiescent channel becomes active, i.e., a signal appears on its input due either to the commencement of communication over that channel or to the end of a silence between words or syllables, the channel detector and the channel register respectively indicate the presence and absence of a signal on that channel input. In either of these two circumstances the position of the appropriate channel in the examination cycle, as recorded by counting means, is supplied to said signalling means while discriminating means discriminates between the two changes of signalling condition by signifying to said signalling means which one of said channel detector and said channel register indicates the presence of a signal on the appropraite channel input. The said signalling means then supplies as an output signal, a code group of pulses defining both this signification and this record, i.e., defining the channel and the nature of the change of signalling condition on that channel. Such a code group of pulses is made distinguishable from a code group of pulses defining a signal sample in at least one characteristic.

In the above manner code groups of pulses are obtained from said signalling means only in respect of those channels which are in actual use, which become active and which become quiescent. These code groups of pulses are supplied in succession as the channel inputs are examined and consequently are combined in time division multiplex. It will be appreciated that the number of code groups of pulses supplied by said signalling means as the result of each examination cycle is not constant so that the sampling rate of active channel inputs will vary. This means that the system will function even when an abnormally large number of the channels are in active use but that the sampling rate then will be reduced so as to result in some loss of quality in the transmitted signals.

The combined code groups of pulses from said signalling means are transmitted to a receiving terminal in which pulse code groups that define signal samples are distinguished from pulse code groups that define changes of signalling condition of particular channels. Thus, the receiving terminal includes means which directs received pulse code groups defining signal samples to a decoder and which directs received pulse code groups defining changes of signalling condition to a channel counter and change discriminating means. The decoder decodes pulse code groups which are directed thereto to produce the corresponding signal samples. The channel counter registers the identity of any channel which is defined in a pulse code group directed thereto and the change discriminating means discriminates between pulse code groups that define channels becoming active and pulse code groups that define channels becoming quiescent.

The channel outputs at the receiving terminal are associated with channel register means which indicates the channels in active use. The outputs of the channels so indicated are selected by a channel selector one at a time in a predetermined sequence corresponding to the positions of these channels in the examination cycle of the transmitting terminal and so that each time a pulse code group defining a signal sample is received the output of the next active channel in the sequence is selected for receiving the decoded signal sample. Thus, if there are "N" active channels, every "Nth" pulse code group defining a signal sample is in respect of the same channel input at the transmitting terminal and the same channel output at the receiving terminal, the synchronization of this channel input with the appropriate channel output being obtained through the pulse code group transmitted when this channel became active. Thus, when a pulse code group is received defining a channel that has become active or quiescent, said channel selector is caused to connect said change discriminating means to said channel register means so as to cause the indication provided by said channel register means in respect of the defined channel to be changed according to the information provided by said change discriminating means.

Figure 2:
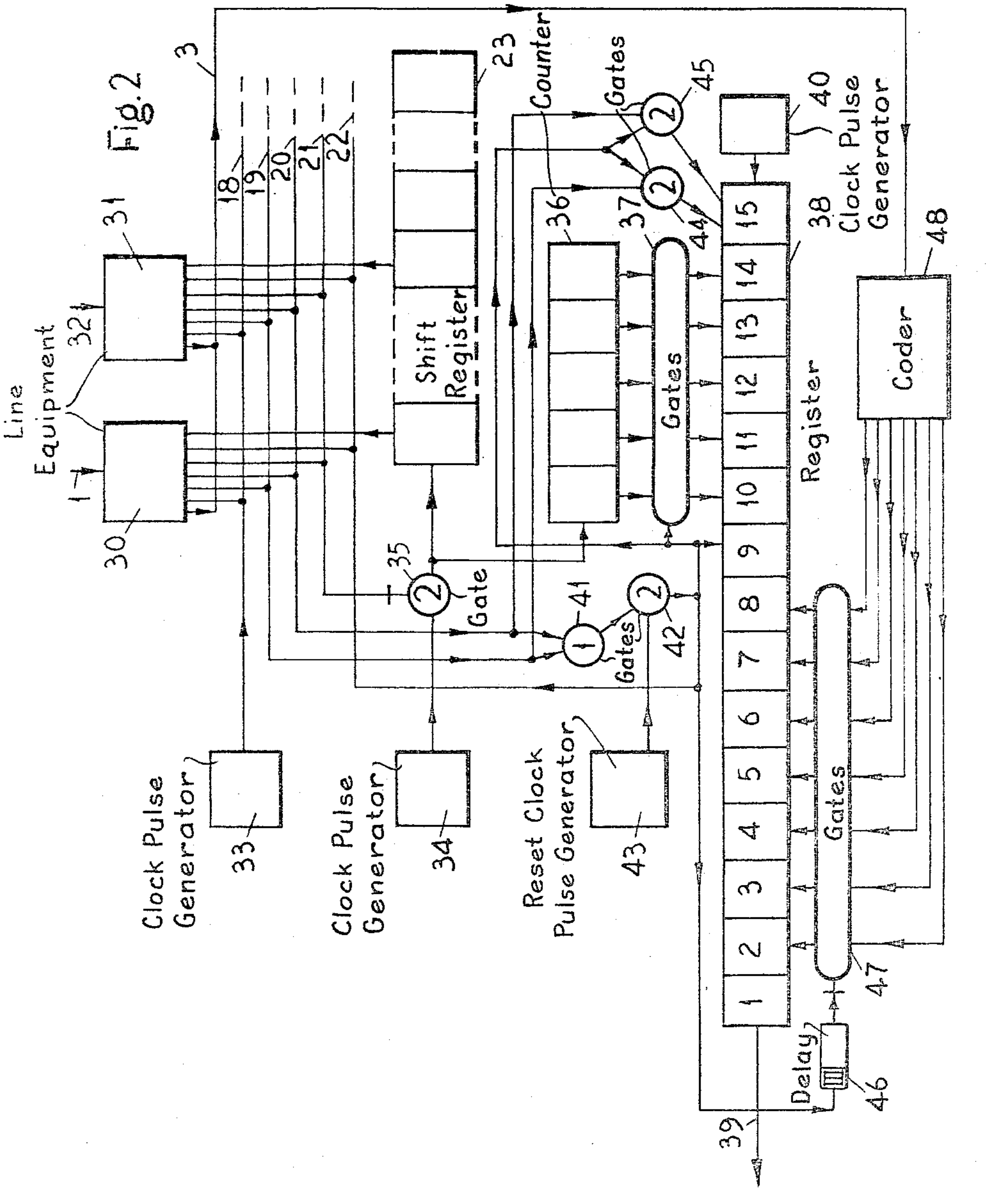
Figure 3:
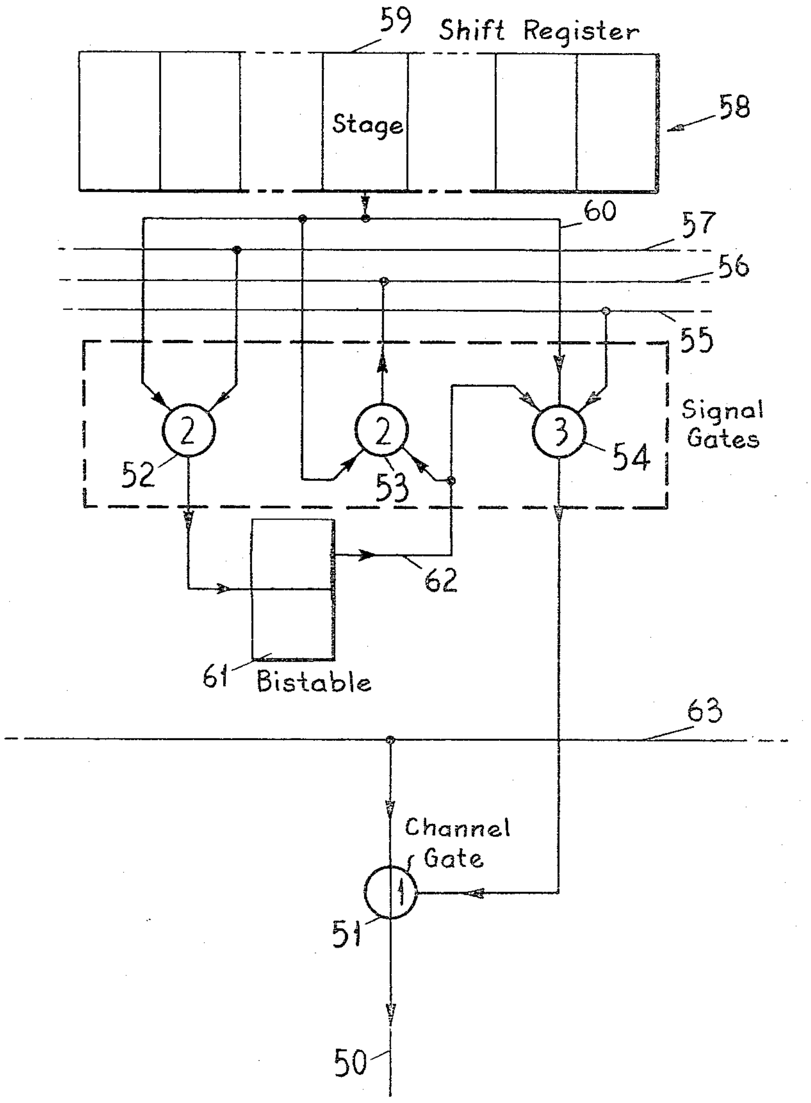
Figure 4:
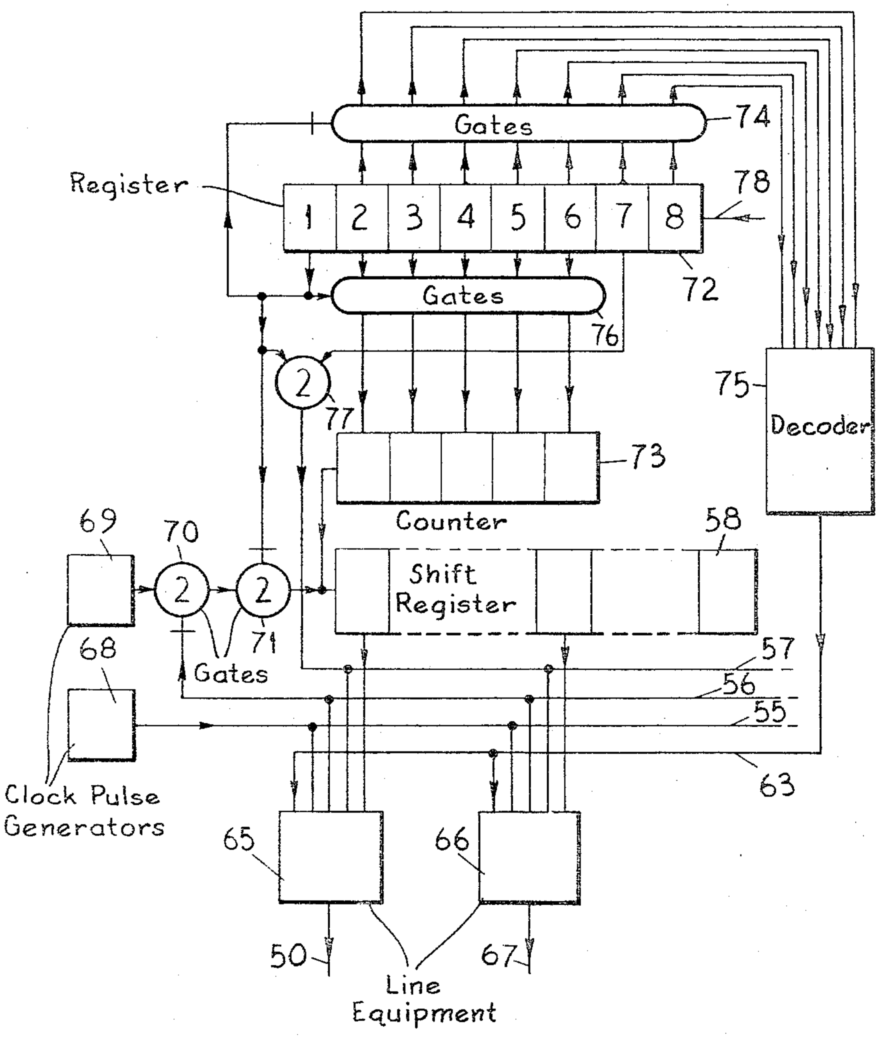

A multichannel pulse code modulation system in accordance with the present invention will now be described by way of example with reference to the accompanying drawings, in which:

FIGURE 1 shows a part of the transmititng terminal in simplified block schematic form, FIGURE 2 shows another part of the transmitting terminal in simplified block schematic form, FIGURE 3 shows a part of the receiving terminal in simplified block schematic form, and FIGURE 4 shows another part of the receiving terminal in simplified block schematic form.

Reference will now be made to FIGURE 1 of the drawings, which shows the part of the transmitting terminal associated with one incoming line 1 corresponding to one of the seventy-five incoming channels. The incoming line 1 is connected to one input of a channel gate 2, the channel gate 2 being a linear "AND" gate having two inputs and one output. The output of the channel gate 2 is connected to a common line 3, to which the output of the other seventy-four channel gates (not shown) are also connected.

The incoming line 1 is also connected to a two-condition bistable trigger circuit 4, hereinafter referred to as the channel detector 4, which is controlled to be in one of its stable conditions when an audio frequency signal is actually present on the incoming line 1, and in its other stable condition when an audio frequency signal is not actually present on the incoming line 1. When in its first condition, corresponding to an audio frequency signal being present on the incoming line 1, the channel detector 4 supplies an output signal over the lead 5, and when in its other condition it supplied an output signal over the lead 6.

It will be appreciated that, for the reasons set out above, there will on average, only be an audio frequency signal actually present on the incoming line 1 for approximately twenty-five percent of the total time, and that it is only when an audio frequency signal is actually present that a signal is supplied over the lead 5.

Signals identical with those supplied over the leads 5 and 6 are also supplied by the channel detector 4 over leads 7 and 8, respectively, which are connected to a further two-condition bistable trigger circuit 9, hereinafter referred to as the channel register 9. The channel register 9 has two output leads 10 and 11.

Associated with the channel gate 2 are five further "AND" gates 12, 13, 14, 15 and 16, and an "OR" gate 17. The equipment common to all the channel gates, such as the channel gate 2, also includes a clock pulse line 18, a first director line 19, a second director line 20, a register gate line 21 and a register set line 22.

The common equipment also includes a shift register 23. The shift register 23 comprises seventy-five identical stages, the stages being associated one to one with the seventy-five channel gates. Stage 24 of the shift register 23 is associated with the channel gate 2. Each stage of the shift register 23 comprises a two-condition bistable trigger circuit which, when in its first stable condition, supplies an output to a shift register line associated with the corresponding channel gate. When the stage is in its second condition, no signal is supplied to the associated shift register line. Shift register line 25 is associated with the channel gate 2.

At a certain initial time, the first stage of the shift register 23 is in its first condition and the other seventy-four stages are in their second condition. When a train of clock pulses is supplied to the first stage of the shift register 23, in a manner to be described later, each clock pulse causes a progressive and cyclic shift of one in the stage which is in its first condition, the preceding stage returning to its second condition at the same time. The train of clock pulses therefore causes signals to be supplied in sequence to the shift register lines associated with the channel gates, a signal being supplied to one, and only one, shift register line at any given time.

Considering again the equipment associated with the channel gate 2, the gate 12 has three inputs and one output. One input is connected to the clock pulse line 18, another input is connected to the shift register line 25, and the other input is connected to the lead 10 from the channel register 9. The output is connected to the channel gate 2.

The gate 13 has three inputs and one output. One input is connected to the shift register line 25, another input is connected to the lead 10 from the channel register 9, and the other input is connected to the lead 6 from the channel detector 4. The output is connected to the first director line 19.

The gate 14 has three inputs and an output. One input is connected to the shift register line 25, another input is connected to the lead 11 from the channel register 9, and the other input is connected to the lead 5 from the channel detector 4. The output is connected to the second director line 20.

The gate 15 has two inputs and one output. One input is connected to the shift register line 25, and the other input is connected to the register set line 22, whilst the ouput is connected to the channel register 9.

The gate 16 has two inputs and one output. One input is connected to the output of the gate 17, and the other input is connected to the shift register line 25, whilst the output is connected to the register gate line 21.

The gate 17 has two inputs and one output. One input is connected to the lead 5 from the channel detector 4, and the other input is connected to the lead 10 from the channel register 9, whilst the output is connected to the gate 16.

The operation of the part of the transmitting terminal so far described with reference to FIGURE 1 will now be explained. At any time when an audio frequency signal is actually present on the incoming line 1 the channel detector 4 is in such a condition that signals are supplied over the leads 5 and 7. These signals are present on average therefore for approximately twenty-five percent of the total time. For the moment it will be assumed that an audio frequency signal is actually present on the incoming line 1 and that the previous time the incoming line 1 was dealt with an audio frequency signal was present on it. This being so, the channel register 9 will be supplying a signal over the lead 10, but not over the lead 11. The reason for this will be made clear later.

It is assumed that the operation has just reached the moment when the stage 24 of the shift register 23 changes to its first condition, so that a signal is then supplied by the stage 24 to the shift register line 25. A signal is therefore supplied to the gate 16 over one of its inputs. As signals are being supplied over the leads 5 and 10, the gate 17 will also be supplying a signal to the gate 16. The gate 16 therefore supplies a signal to the register gate line 21, the register gate line 21 being connected to common equipment in the transmitting terminal which operates to prevent a further clock pulse being supplied to the shift register 23 until the operations which are to be performed in connection with the incoming line 1 are completed. Until these operations are completed, therefore, the stage 24 of the shift register 22 will continue supplying a signal to the shift register line 25.

The common equipment in the transmitting terminal is also supplying a continuous train of clock pulses to the clock pulse line 18. These clock pulses have a constant pulse repetition frequency of 250 kilocycles per second and the duration of each clock pulse is one microsecond. Shortly after the beginning of the interval for which the stage 24 of the shift register 23 remains in its first condition, a clock pulse will appear on the clock pulse line 18 and be supplied over one of the inputs to the gate 12. At this instant signals will also be supplied over the other two inputs to the gate 12 from the shift register line 25 and the lead 10 from the channel register 9. A signal will therefore be supplied by the gate 12 to the channel gate 2, and at this instant the audio frequency signal present on the incoming line 1 will be sampled, and the sample voltage so obtained will be supplied by way of the common line 3 to the coder.

Towards the ends of the interval allotted to performing the necessary operations in respect of the incoming line 1, a pulse will be supplied over the register set line 22. This pulse will be supplied over one of the inputs to the gate 15, a signal still being supplied over the other input from the shift register line 25 at the same time. The gate 15 will therefore supply a signal to the channel register 9, which will be reset to match the condition of the channel detector 4 as represented by the signals supplied over the leads 7 and 8. In the case under consideration therefore there will be no change in the condition of the channel register 9.

At the end of the interval allotted to performing the necessary operations in respect of the incoming line 1, a further shift pulse will be supplied to the shift register 23, so that the stage 24 then reverts to its second condition and a signal is no longer supplied to the shift register line 25 associated with the incoming line 1.

The other possibilities in respect of the conditions of the channel detector 4 and the channel register 9 will now be considered. It is possible that at the instant the stage 24 of the shift register 23 is triggered into its first condition, the channel register 9 is supplying a signal over the lead 10, indicating that an audio frequency signal was actually present the previous time the incoming line 1 was dealt with, but the channel detector 4 is supplying signals over the leads 6 and 8, indicating that an audio frequency signal is no longer actually present on the incoming line.

In this case, as soon as the stage 24 of the shift register 23 assumes its first condition, it will supply a signal over one of the inputs to the gate 16. As a signal is being supplied over the lead 10 from the channel register 9, the gate 17 will also be supplying a signal to the gate 16. The gate 16 therefore supplies a signal to the register gate line 21, so that no further clock pulse is supplied to the shift register 23 until the operations which are to be performed in connection with the incoming line 1 are completed. At the same time, the shift register line 25 will supply a signal over one of the inputs to the gate 13. Signals will also be being supplied over the other two inputs to the gate 13 from the channel detector 4 by way of the lead 6, and from the channel register 9 by way of the lead 10. The gate 13 therefore supplies a signal to the first director line 19.

This signal on the first director line 19 causes the common equipment to operate to transmit a code group of pulses in respect of the incoming line 1 to indicate that the incoming line 1 no longer has an audio frequency signal present on it. This signal on the first director line 19 also operates to prevent a code group of pulses being supplied from the coder for transmission in respect of the zero sample voltage which will be supplied to the common line 3 on the occurence of the next clock pulse on the clock pulse line 18.

Then, towards the end of the interval for performing the necessary operations in respect of the incoming line 1, a pulse is supplied over the register set line 22 to the gate 15. As the shift register line 25 will also be supplying a signal to the gate 15, the gate 15 supplies a signal to the channel register 9. This will cause the channel register 9 to change its condition, so that it is then supplying a signal over the lead 11.

If by the time the stage 24 of the shift register 23 next assumes its first condition, an audio frequency signal is again actually present on the incoming line 1, so that the channel detector 4 is again supplying a signal over the lead 5, the operation will be as follows. As soon as the stage 24 of the shift register 23 assumes its first condition, it will supply a signal over one of the inputs to the gate 16. As a signal is being supplied over the lead 5, the gate 17 will also be supplying a signal to the gate 16. The gate 16 therefore supplies a signal to the register gate line 21, so preventing a further clock pulse from being supplied to the shift register 23 until the operations which are to be performed in connection with the incoming line 1 are completed.

The shift register line 25 will also supply a signal over one of the inputs to the gate 14. Signals will also be being supplied over the other two inputs to the gate 14 from the channel detector 4 by way of the lead 5, and from the channel register 9 by way of the lead 11. The gate 14 will therefore supply a signal to the second director line 20.

This signal on the second director line 20 causes the common equipment to operate to transmit a code group of pulses in respect of the incoming line 1 to indicate that during the next cycle a code group of pulses defining a sample voltage may be expected in respect of the incoming line 1. This signal on the second director line 20 also operates to prevent a code group of pulses from being supplied by the coder for transmission. This is necessary because the channel register 9 will not be supplying a signal over the lead 10 to the gate 12, so that on the occurrence of the next clock pulse on the clock pulse line 18 no sample voltage will be supplied by the channel gate 2 to the common line 3. This being so, the coder will interpret the absence of a sample voltage on the common line 3 as meaning that the sample voltage is zero, and it will prepare a code group of pulses for transmission accordingly.

Referring now to FIGURE 2 of the drawings, this again shows part of the transmitting terminal, some of the equipment shown being common to FIGURE 1. Where possible, therefore, the same reference numerals have been used. Each of the rectangles 30 and 31 represents in simplified form some of that part of the equipment shown in FIGURE 1 which is associated with the incoming line 1, and another incoming line 32, respectively. It will be assumed that the seventy-five incoming channels are numbered in the sequence in which they are dealt with, and that the incoming line 1 belongs to the first incoming channel and the incoming line 32 belongs to the thirty-second incoming channel.

The common line 3, the clock pulse line 18, the first and second director lines 19 and 20, the register gate line 21, the register set line 22 and the shift register 23 are shown separately in FIGURE 2.

The clock pulse line 18 is connected to a clock pulse generator 33 which supplies the required train of clock pulses. As previously stated, the train of clock pulses supplied by the clock pulse generator 33 has a pulse repetition frequency of 250 kilocycles per second, and the frequency of operation of the clock pulse generator 33 is locked relative to the frequency of operation of another clock pulse generator 34, which supplies a train of clock pulses having a pulse repetition frequency of 12 megacycles per second.

The clock pulses supplied by the clock pulse generator 34 are supplied to one input of a gate 35. The gate 35 has another input which is connected to the register gate line 21, and two outputs, one of which is connected to the first stage of the shift register 23, and the other of which is connected to a counter 36. The gate 35 operates so that clock pulses are supplied from the clock pulse generator 34 to the first stage of the shift register 23 and to the counter 36, unless a signal is supplied to the gate 35 from the register gate line 21.

The counter 36 comprises five two-condition bistable trigger circuits, so that output signals derived from the five stages define the number of pulses supplied to the input stage of the counter 36 up to a maximum of thirty-two input pulses. The outputs of the five stages of the counter 36 are connected by way of five transfer gates 37, one of which is individual to each of the stages of the counter 36, to the tenth to fourteenth stages of an output register 38.

The output regsiter 38 is a fifteen stage shift register comprising fifteen two-condition bistable trigger circuits. The first stage of the output register 38 is connected to the outgoing line 39 over which the required output pulse signal for transmission is supplied. Associated with the output register 38 is a further clock pulse generator 40 which supplies a pulse signal having a pulse repetition frequency of 2 megacycles per second, this signal being supplied to the fifteenth stage of the output register 38. Digits stored in the output register 38 are therefore shifted towards the first stage of the output register 38, and hence are supplied to the outgoing line 39, at a frequency of 2 megacycles per second.

The first and second director lines 19 and 20 are connected to the two inputs respectively of an "OR" gate 41, the gate 41 having one output, which is connected to one of the inputs of an "AND" gate 42. The gate 42 has another input which is connected to a reset clock pulse generator 43 which supplies a pulse signal having a pulse repetition frequency of 250 kilocycles per second. The frequency of operation of the reset clock pulse generator 43 is locked relative to the frequency of operation of the clock pulse generator 33. The gate 42 has outputs connected to the register set line 22, to the ninth stage of the output register 38, to the inputs of gates 44 and 45, and by way a delay circuit 46 to transfer gates 47. Each of the gates 44 and 45 is an "AND" gate having another input which is connected to the first or second director line 19 or 20, respectively. Each of the gates 44 and 45 has an output which is connected to the fifteenth stage of the output register 38. The delay circuit 46 operates to delay pulses supplied thereto by four microseconds before supplying them to the transfer gates 47.

Each of the transfer gates 37 is an "AND" gate which supplies an output to the output register 38 when signals are supplied over both its inputs simultaneously.

The common line 3 is connected to the coder 48. The coder 48 will not be described in detail, but it may make use of some of the arrangments described in copending U.S. patent applications Nos. 235,374, now Patent No. 3,231,821, 235,375, now Patent No. 3,174,101, and 242,-168 now abandoned. The operation of the coder 48 is such that it supplies a code group of pulses representing a seven digit binary number in respect of each sample voltage supplied to it over the line 3. In each such number, the first digit indicates the polarity of the sample voltage and the remaining six digits indicate its magnitude.

Signals representing the seven digits of each such number are supplied by the coder 48 to the inputs of the seven transfer gates 47. The outputs of the transfer gates 47 are connected to the second to eighth stages respectively of the output register 38.

The operation of the equipment at the transmitting terminal will now be further dsecribed with reference to FIGURES 1 and 2. It is assumed that at the time under consideration an audio frequency signal is present on the incoming line 1 and further that an audio frequency signal was also present on the incoming line 1 the last time the first incoming channel was dealt with. In addition, it is assumed that no audio frequency signal is present on any of the second to thirty-first incoming channels inclusive and that a signal is present on the incoming line 32 corresponding to the thirty-second incoming channel, but that no audio frequency signal was present on the incoming line 32 the last time the thirty-second incoming channel was dealt with.

This being so, a sample voltage will be supplied to the common line 3 in dependence upon the audio frequency signal present on the incoming line 1, and this sample voltage will be supplied to the coder 48. The coder 48 will therefore prepare the required code group of pulses in respect of this sample voltage and when the channel group previously present in the first to eighth stages of the output register 38 has been supplied to the outgoing line 39, signals in respect of this code group of pulses will be supplied by way of the transfer gates 47 to the output register 38.

As no signal is supplied to the first stage of the output register 38, this stage will be storing a binary digit "0," this digit forming the first digit in the channel group supplied to the outgoing line 39 in respect to the channel under consideration.

As there is no signal on the first or second director line 19 or 20, the gate 42 will not supply an output, so that the transfer gates 37 and the gates 44 and 45 do not, in this case, supply any signals to the output register 38.

The actual time taken in sampling the speech signal on the incoming line 1 is one microsecond, this time being determined by the duration of the clock pulses supplied by the clock pulse generator 33. The total time available for obtaining the sample voltage and dealing with the sample voltage obtained is, however, four microseconds, the remainder of this time being used by the coder 48 and the associated parts of the equipment to prepare the required code group of pulses.

There is therefore an interval of three microseconds available after the required sample voltage has been obtained. During these three microseconds clock pulses are permitted to pass from the clock pulse generator 34 by way of the gate 35 to the shift register 23. This means that signals will be supplied successively to the shift register lines 25 associated with the second and subsequent incoming channels. As the clock pulse generator 34 is supplying clock pulses with a pulse repetition frequency of 12 megacycles per second, this means that a maximum of thirty-six clock pulses may be supplied to the shift register 23 during this interval of three microseconds.

When the first of these clock pulses has been supplied to the shift register 23, the shift register 23 will supply a signal to the shift register line 25 associated with the second incoming channel. A signal will therefore be supplied to the gate 16 associated with that channel. At this time, however, neither the channel detector 4 nor the channel register 9 associated with the second channel will be supplying a signal to the gate 17, so that no signal will be being supplied over the other input to the gate 16. This means that no signal will be supplied to the register gate line 21, and that the gate 35 will continue to permit clock pulses to pass from the clock pulse generator 34 to the shift register 23.

The same thing will happen in respect of the third to thirty-first channels inclusive.

When the next clock pulse is supplied to the first stage of the shift register 24, a signal will be supplied to the shift register line 25 corresponding to the thirty-second incoming channel. In the case of this channel the channel detector 4 will be supplying a signal over the lead 5 to the gate 17, so that when the signal is supplied to the shift register line 25 the gate 16 will supply a signal to the register gate line 21. This signal is supplied to the gate 35 causing it to prevent further clock pulses being supplied to the shift register 23.

In addition, the clock pulses which are supplied to the shift register 23 are also supplied to the counter 36, so that the counter 36 will be registering a count of thirty-one, indicating that the incoming line 32 is the thirty-first channel after the last active incoming channel.

At this time, signals will be being supplied over all three inputs to the gate 14, so that the gate 14 will supply a signal to the second director line 20. This signal is therefore supplied to the gates 41 and 45. Then, when a pulse is next supplied by the reset pulse generator 43 to the gate 42, the gate 42 is operated so that a digit "1" is inserted in the ninth stage of the output register 38 and, at the same time, the transfer gates 37 are operated so that digits corresponding to the count registered in the counter 36 are transferred to the tenth to fourteenth stages of the output register 38. In addition, the gate 45 is operated so as to supply a digit "1" which is inserted in the fifteenth stage of the output register 38.

The significance of these digits is as follows. The digit "1" in the ninth stage of the output register 38 (which will appear in the first position in the channel group) indicates that the code group of pulses which follows relates to the change of state of a channel from active to inactive or vice versa; the digits in the ten to fourteenth stages of the output register 38 (which will appear in the second to sixth positions in the channel group) indicate how many channels have been scanned since the last channel in respect of which a channel group was transmitted; and the digit in the fifteenth stage of the output register 38 (which will appear in the seventh position in the channel group) indicates whether that channel has changed from active to inactive or from inactive to active.

Furthermore, at the time referred to in the last preceding paragraph but one, the gate 42 will supply a pulse to the delay circuit 46, and hence, after a delay of 4 microseconds, to the transfer gates 47. This pulse supplied to the transfer gates 47 prevents signals being supplied from the coder 48 by way of the transfer gates 47 to the output register 38. This is necessary because of the inherent delay in the operation of the coder 48. The delay is such that at the time when sufficient clock pulses have been supplied, by the clock pulse generator 40, to the output register 38 to bring the digits in respect of the thirty-second incoming channel (initially inserted in the ninth to fifteenth stages) to the second to eighth stages, the coder 48 will have prepared a code group in respect of the sample voltage next supplied to the common line 3. As this sample voltage is, in fact, zero, having been derived from an incoming line on which no incoming signal is actually present, this code group must not be supplied to the output register 38.

The manner in which the equipment at the receiving terminal operates to interpret and use these digits in the received signal will now be described. Reference will first be made to FIGURE 3 of the drawings, which shows the part of the receiving terminal associated with one outgoing line 50 corresponding to one of the seventy-five outgoing channels. The outgoing line 50 is connected to the output of a channel gate 51, the channel gate 51 being a linear "AND" gate having two inputs and one output.

Associated with the channel gate 51 are three further "AND" gates 52, 53 and 54. The equipment common to all the channel gates, such as the channel gate 51, also includes a clock pulse line 55, a register digit line 56 and a register set line 57.

The common equipment also includes a shift register 58, which is similar to the shift register 23 in the transmitting terminal, the stages of the shift register 58 being associated one to one with the seventy-five channel gates in the receiving terminal. Stage 59 of the shift register 58 is associated with the channel gate 51. When in its first stable condition each stage of the shift register 58 supplies an output signal to a shift register line associated with the corresponding channel gate in the receiving terminal. When the stage is in its second stable condition, no signal is supplied to the associated shift register line. Shift register line 60 is associated with the channel gate 51.

Also associated with the channel gate 51 is a two-condition bistable trigger circuit 61, hereinafter referred to as the receive channel register 61. When in one of its stable conditions the receive channel register 61 supplies an output signal over a lead 62; no signal being supplied over the lead 62 when it is in its other stable condition.

The gate 52 has two inputs and one output. One input is connected to the shift register line 60, and the other input is connected to the register set line 57, whilst the output is connected to the receive channel register 61.

The gate 53 has two inputs and one output. One input is connected to the shift register line 60, and the other input is connected to the lead 62 from the receive channel register 61, whilst the output is connected to the register digit line 56.

The gate 54 has three inputs and one output. One input is connected to the lead 62 from the receive channel register 61, another input is connected to the shift register line 60, and the other input is connected to the clock pulse line 55. The output is connected to the channel gate 51.

The other input, previously mentioned, to the channel gate 51 is connected to a common line 63, which is common to all the channel gates in the receiving terminal and which is connected to the decoder, to which reference will be made later.

Referring now to FIGURE 4 of the drawings, this again shows part of the receiving terminal, some of the equipment shown being common to FIGURE 3. Where possible, therefore, the same reference numerals have been used. Each of the rectangles 65 and 66 represents in simplified form some of that part of the equipment shown in FIGURE 3 which is associated with the outgoing line 50, and with another outgoing line 67, respectively. It will be assumed that the seventy-five outgoing channels are numbered in the sequence in which they are dealt with, and that the outgoing line 50 belongs to the fiftieth outgoing channel and the outgoing line 67 belongs to the sixty-seventh outgoing channel.

The common line 63, the clock pulse line 55, the register digit line 56 and the register set line 57 are shown separately in FIGURE 4.

The clock pulse line 55 is connected to a clock pulse generator 68 which supplies the required train of clock pulses. These clock pulses have a pulse repetition frequency of 250 kilocycles per second, and the frequency of operation of the clock pulse generator 68 is locked relative to the frequency of operation of another clock pulse generator 69, which supplies a train of clock pulses having a pulse repetition frequency of 12 megacycles per second. The clock pulses supplied by the clock pulse generator 69 are supplied to one input of an "AND" gate 70. The gate 70 has two inputs and one output, the other input being connected to the register digit line 56. The output of the gate 70 is connected to one input of an "AND" gate 71. The gate 71 has two inputs and one output, which is connected to the first stage of the shift register 58.

The equipment at the receiving terminal also includes an input register 72, which is generally similar to the output register 38 at the transmitting terminal (FIGURE 2), but has only eight stages, and a counter 73, which is similar to the counter 36 at the transmitting terminal (FIGURE 3).

The second to eighth stages of the input register 72 are connected one to one to a group of seven transfer gates 74, each of which has two inputs and one output. The outputs of the transfer gates 74 are connected to the decoder 75. The decoder 75 will not be described in detail, but it may make use of some of the arrangements described in the above mentioned co-pending patent applications. The operation of the decoder 75 is such that when it is supplied with a code group of pulses representing a seven digit binary number, from the transfer gates 74, it supplies an amplitude modulated pulse to the common line 63, this pulse having the polarity and magnitude of the sample voltage corresponding to that code group of pulses.

The second to sixth stages of the input register 72 are also connected by way of a group of five transfer gates 76 to the five stages respectively of the counter 73. Each of the transfer gates 76 has two inputs and one output. The other input of each of the transfer gates 74 and 76 and of the gate 71 is connected to the first stage of the input register 72.

The first stage of the input register 72 is also connected to one of the inputs of an "AND" gate 77. The gate 77 has two inputs, the other of which is connected to the seventh stage of the input register 72, and an output which is connected to the register set line 57.

The received pulse signal is supplied to the eighth stage of the input register 72 over an incoming line 78.

The operation of the receiving terminal will now be described, reference first being made to FIGURE 4. The received pulse signal, after suitable amplification and reshaping, is supplied over the incoming line 78 to the input register 72. For the purposes of the present description it will first be assumed that a channel group of pulses in respect of a channel which had an audio frequency signal actually present at the relevant instant of sampling, and at the previous instant of sampling, has just been supplied to the input register 72. The first to eighth stages of the input register 72 will therefore be in conditions corresponding to the eighth digits of this channel group. As this channel group includes a code group of pulses, corresponding to the digits stored in the second to eighth stages of the input register 72, relating to a sample voltage, the first stage of the input register 72 will be in the condition corresponding to a digit "0." This being so, the first stage of the input register 72 will not be supplying an output signal.

When the channel group is stored in the input register 72 in the manner outlined above, a signal is supplied to the transfer gates 74 so as to cause a code group of pulses corresponding to the digits stored in the second to eighth stages of the input register 72 to be supplied to the decoder 75. The decoder 75 then operates to supply an amplitude modulated pulse to the common line 63, this pulse having the same polarity and amplitude as the sample voltage corresponding to the code group of pulses.

Referring also to FIGURE 3, whilst the decoder 75 has been preparing this amplitude modulated pulse, the clock pulse generator 69 will have been supplying clock pulses by way of the gates 70 and 71 to the shift register 58. The shift register 58 will therefore have been supplying signals to the shift register lines associated with the outgoing lines. Considering the case of an outgoing line whose associated receive channel register 61 is not supplying a signal over the lead 62, the application of a signal to the associated shift register line 60 will not cause any action, and the shift register 58 will pass on to the next outgoing line.

In the case of an outgoing line, say the outgoing line 50, in which the receive channel register 61 is supplying a signal over the lead 62, the application of a signal to the shift register line 60 will cause the gate 53 to supply a signal to the register digit line 56. This signal is supplied to the gate 70, which operates to prevent further clock pulses being supplied by the clock pulse generator 69 to the shift register 58. On the occurrence of the next clock pulse supplied by the clock pulse generator 68 to the clock pulse line 55, it is arranged that the amplitude modulated pulse supplied by the decoder 75 is present on the common line 63, so that the gate 54 supplies a signal to the gate 51. The gate 51 therefore supplies the amplitude modulated pulse to the outgoing line 50.

It will be appreciated that when audio frequency signals are present on the corresponding incoming line at the transmitting terminal, a series of such amplitude modulated pulses will be supplied to the outgoing line 50, these pulses being supplied to a pulse lengthening circuit and low-pass filter, to provide an output signal which is the required reconstituted audio frequency signal in respect of that channel.

If the next channel group supplied to the input register 72 includes a code group of pulses defining a sample voltage, the shift register 58 will pass on to the next outgoing line in respect of which the associated receive channel register 61 is supplying a signal over the lead 62, as the sample voltage will be in respect of that channel.

It is now necessary to consider the operation in the case where the received channel group indicates that a channel on which audio frequency signals were present the last time it was dealt with no longer has audio frequency signals present. In this case, when the channel group is stored in the input register 72, the first stage of the input register 72 will be in the condition corresponding to a digit "1." The first stage of the input register 72 will therefore be supplying a signal to the transfer gates 74, so preventing the supply of pulses to the decoder 75, and will also be supplying a signal to the gate 71, so preventing clock pulses from the clock pulse generator 69 from reaching the shift register 58.

In addition, the first stage of the input register 72 will be supplying a signal to the transfer gates 76, so that the count represented by the conditions of the second to sixth stages of the input register 72 is transferred to the counter 73. The counter 73 then operates to supply clock pulses to the shift register 58, the number of clock pulses supplied being equal to the count transferred to the counter 73. When this has been done, therefore, the shift register 58 will be supplying a signal to the shift register line 60 associated with the outgoing line in respect of which some action is required. In addition, the seventh stage of the input register 72 will be in the condition corresponding to a digit "0," indicating that the channel under consideration is one that has become inactive. The first stage of the input register 72 is supplying a signal by way of the gate 77 to the register set line 57 and this is arranged to cause the gate 52 to supply a signal to the receive channel register 61 causing it to change its condition so as no longer to supply a signal over the lead 62.

In the case where the received channel group relates to a channel on which no audio frequency signals were present the last time it was dealt with, but which now has audio frequency signals present, the operation is similar, except that the seventh stage of the input register 72 also supplies a signal by way of the gate 77 to the register set line 57, this being arranged to cause the relevant receive channel register 61 to change its condition so as to supply a signal over the lead 62.

Summarising therefore, the system operates so that channel groups are only transmitted in respect of channels on which audio frequency signals are present at the instant of sampling and were present at the previous instant of sampling, channels on which audio frequency signals are actually present at the instant of sampling but were not present at the last instant of sampling, and channels on which audio frequency signals are not actually present at the instant of sampling but were present at the previous instant of sampling. Channel groups are not transmitted in respect of the other channels. This means that the waste of available capacity of the system, as compared with the previously proposed system, is reduced.

If the average duration of an audio frequency signal is assumed to be one second, then it may be shown that only one channel group in five thousand will be giving information in respect of the change of a channel from active to inactive or vice versa, so that the presence of these channel groups does not significantly reduce the capacity of the system.

In the event of the number of channels on which audio frequency signals are actually present becoming unusually high, the frequency of sampling will be reduced below 10 kilocycles per second. This will result in a slight loss of quality, but not in complete loss of the audio frequency signals in respect of any of the channels. Conversely, if the number of channels on which audio frequency signals are actually present becomes unusually small, the sampling rate may become undesirably high, and it may be desirable to include some arrangement to limit the frequency of sampling.

As was previously stated, it is in theory possible for the transmitting terminal to scan thirty-six incoming lines whilst a sample voltage in respect of one incoming line is being dealt with by the coder. In practice, to provide some margin, this number would not exceed thirty-two. To ensure that this is the case, three of the incoming lines, for example, those corresponding to the thirty-third, sixty-fifth and seventy-fifth channels are treated as being permanently active, so that, in fact, these incoming lines provide a sample voltage every time they are dealt with. With this arrangement, even when no audio frequency signals are present on any of the incoming lines, the spacing between active channels cannot exceed thirty-two.

With the arrangement described no channel group can comprise a group of eight digits "1." Such a channel group may therefore be transmitted continuously in respect of say, the seventy-fifth channel, to provide a synchronising signal to enable the receiving terminal to be synchronised with the transmitting terminal.

Although in the particular system described separate counters 36 (FIGURE 2) and 23 (FIGURE 4) are provided, this will not in all cases be essential. Thus where the coder 48 (FIGURE 2) and decoder 75 (FIGURE 4) incorporate counters, and are otherwise suitable, these counters may be used.

Also, other methods of switching from channel to channel may be used instead of the shift registers 23 (FIGURES 1 and 2) and 58 (FIGURES 3 and 4). For example, the switching may be done by a binary counter with suitable associated logic circuits.

In the system described above the distinction between a channel group which includes a code group of pulses relating to a sample voltage, and a channel group of pulses which includes a code group of pulses relating to the change of state of a channel from active to inactive or vice versa, is made by the first digit in the eight digit channel group. In the first case the first digit of the channel group will be "0" and in the second case the first digit of the channel group will be "1."

If, for example due to interference, the first digit of a channel group is incorrectly received by the receiving terminal, the receiving terminal will be incorrectly set up, and the resulting errors will not be corrected until the next occasion when there is no audio frequency signal on any of the incoming channels to the transmitting terminal.

In some circumstances the transmission might be sufficiently reliable for such errors only to occur very infrequently. In other situations, however, further measures have to be introduced to prevent, or at least reduce, errors arising in this way. Two such measures which can be used will now be briefly mentioned.

In the first case an error correcting code is used. It has been previously proposed to include additional digits in a channel group (or "word") so as to enable errors in individual digits in the channel group to be detected and corrected. Thus it is possible, for example, to increase each channel group from eight to ten digits for this purpose. However, this would provide a degree of error correction on all channel groups, including those which include a code group of pulses relating to a sample voltage, whereas in practice such channel groups are relatively unimportant, and the extreme accuracy is required only in those channel groups which include a code group of pulses relating to the change of state of a channel.

It would be preferable therefore for only the channel groups which include a code group of pulses relating to the change of state of a channel to be modified, and this is conveniently done by making such channel groups of sixteen digits. Such a sixteen digit channel group contains a number of features identifying it as relating to the change of state of a channel, and hence in the receiving terminal, all combinations of two successive eight digit channel groups are inspected to see if they are in fact a sixteen digit channel group. This necessitates the input register 72 (FIGURE 4) being extended so as to provide storage for sixteen digits simultaneously to enable this inspection to be made. This would also mean that there would be a slight delay, equal to the duration of one channel group at the frequency of transmission, before a channel group received by the receiving terminal could be utilised, this delay providing time for each channel group to be inspected with the succeeding one.

With this arrangement, the chance of an error arising would be substantially reduced, but not completely eliminated. Because of this, the second measure for correcting errors, now to be described, can usefully be used in combination with the measure just described.

In the second case, an arrangement of feedback checking is employed. In this arrangement, one of the seventy-five channels is permanently allocated for checking. At the receiving terminal the outgoing channels are inspected in rotation at the rate of one per frame, and the state of these channels, that is to say the condition of the receive channel register 61 (FIGURE 3) is transmitted back to the transmitting terminal. There it is used to check that the corresponding incoming channel, that is to say the channel register 9 (FIGURE 1) for the corresponding channel, is in the same state, and if not to switch the channel register 9 to correspond with the receive channel register 61. As the average frame repetition rate is about 10 kilocycles per second, all the channels would be checked in this way about once every 7.5 miliseconds.

Thus, if due to an undetected error, the receive channel register 61 (FIGURE 3) for outgoing line 50 had been incorrectly switched so as to indicate that the corresponding incoming channel to the transmitting terminal was active, then on checking and transmitting back to the transmitting terminal, the corresponding channel register 9 (FIGURE 1) would be similarly switched. However, during the next frame it will be discovered that this incoming channel was not carrying an audio frequency signal, and so both the channel register 9 and the receive channel register 61 would be switched back to the condition indicating that the channel is inactive.

The alternative case of a channel incorrectly omitted would be dealt with in a similar way.

I claim:

1. Transmitting terminal equipment for a pulse code modulation system having a plurality of communication channels, wherein there are provided a plurality of channel inputs one for each communication channel, means to examine the channel inputs in rotation, channel detector means to indicate the presence and absence of signals on said inputs at each examination, channel register means to indicate the presence and absence of signals at the last preceding examination of said inputs, sampling means for sampling the signal amplitude on a channel input when said detector and register means both indicate the presence of a signal on that input, coding means to code each sample provided by said sampling means, counting means for registering the position of any channel in the examination cycle, discriminating means to discriminate between channels that become active and channels that become quiescent by signifying which of said detector means and said register means indicates the presence of a signal on a channel input when one only thereof so indicates at the examination of that input, and signalling means which is connected to said coding means to supply as an output signal a code group of pulses defining the amplitude of each signal sample coded by said coding means and which further is connected to both said counting means and said discriminating means to supply as an output signal a code group of pulses defining both the signification provided in respect of any channel by said discriminating means and the position of that channel in the examination cycle as registered by said counting means whereby as the channel inputs are examined in rotation code groups of pulses combined in time division multiplex are supplied by said signalling means only in respect of those channels which are in active use, which become active and which become quiescent as indicated by said input detector means and said input register means.

2. Equipment in accordance with claim 1 wherein said channel detector means comprises a plurality of channel detectors each connected to said means to examine the channel inputs in rotation and to a different one of said channel inputs and each adapted to indicate the presence and absence of signals on its channel input at the examinations of that input.

3. Equipment in accordance with claim 2 wherein said channel register means comprises a plurality of channel registers each connected to said means to examine the channel inputs in rotation and to a different one of said channel detectors and each adapted to register the indication provided by its channel detector at the last preceding examination of the channel input connected to that channel detector.

4. Equipment in accordance with claim 3 wherein said means to examine the channel inputs in rotation includes a plurality of gating arrangements each connected to the channel detector and channel register of a different one of the channel inputs and a gate selector connected to said gating arrangements and adapted to select those gating arrangements in rotation.

5. Equipment in accordance with claim 4 wherein said gate selector comprises pulse registering means which is connected to said gating arrangements and which is adapted to select those gating arrangements in rotation and each in response to an electric pulse supplied to that registering means, pulse supply means for supplying regularly recurring electric pulses and inhibiting gate means connected between said pulse supply means and said pulse registering means to inhibit temporarily the supply of pulses to that registering means upon the supply of an inhibiting signal to that gate means.

6. Equipment in accordance with claim 5 wherein each said gating arrangement includes inhibiting signal gate means which is connected to the channel detector and channel register for that gating arrangement, to said pulse registering means and to said inhibiting gate means and which is adapted to supply an inhibiting signal to said inhibiting gate means when at least one of the associated channel detector and channel register indicates the presence of a signal at the examination of their channel input.

7. Equipment in accordance with claim 6 wherein said counting means is connected to said inhibiting gate means to count the pulses passed by that gate means to said pulse registering means.

8. Equipment in accordance with claim 7 wherein transfer gate means is connected between said counting means and said signalling means and is connected to said discriminating means whereby the pulse count recorded in said counting means is transferred to said signalling means when said discriminating means signifies that a channel has changed between the active and quiescent conditions.

9. Equipment in accordance with claim 4 wherein each said gating arrangement includes first and second discriminating gate means which form part of said discriminating means and of which said first gate means is connected to the channel detector and channel register for that gating arrangement to indicate when the associated channel becomes active and said second gate means also is connected to that channel detector and that channel register to indicate when that channel becomes quiescent.

10. Equipment in accordance with claim 9 wherein there is means connected between said signalling means and said first and second discriminating gate means to effect the insertion of a pulse at a characteristic position in each of the code groups of pulses supplied by said signalling means that define channels becoming active and quiescent whereby such code groups of pulses are distinguished from the code groups of pulses defining signal samples.

11. Equipment in accordance with claim 4 wherein said sampling means comprises a plurality of channel gates each of which is connected to a different one of said channel inputs, to the gating arrangement for that channel input and to said coding means whereby that input gate is opened to sample the signal on its channel input when the channel detector and channel register of that input both indicate the presence of a signal at the selection of their gating arrangement.

12. Receiving terminal equipment for a pulse code modulation system which has a plurality of communication channels and in which code groups of pulses transmitted from a transmitting terminal are produced at that terminal by equipment which is in accordance with claim 1, including a code group register for receiving the code groups of pulses, decoding means for decoding code groups of pulses which define signal samples, change discriminating means for discriminating between code groups of pulses that define channels becoming active and code groups of pulses that define channels becoming quiescent, a channel counter to register the identity of any channel which is defined by a code group of pulses directed to that counter, means connected to said code group register, to said decoding means, to said change discriminating means and to said channel counter for directing code groups of pulses which define signal samples from said code group register to said decoding means and for directing code groups of pulses which define channels becoming active and quiescent from said code group register to said channel counter and said change discriminating means, a plurality of channel outputs, one for each channel, channel register means to indicate which channels are in active use and which channels are quiescent, and a channel selector which is connected to said channel outputs, said decoding means and said channel register means for selectively connecting said decoding means to the channel outputs of channels indicated as active by said channel register means one at a time in a predetermined order whereby signal samples from said decoding means are directed to the revelent channel outputs and which also is connected to said channel counter and said change discriminating means to facilitate the selective control by said change discriminating means of the indication provided by said channel register means in respect of any channel identified in said channel counter as the result of a received code group of pulses which is directed to that counter and that discriminating means.

13. Equipment in accordance with claim 12 wherein said channel register means comprises a plurality of two-condition bi-stable means, one for each channel, each said bi-stable means indicating by one of its conditions that its channel is in active use and indicating by the other one of its conditions that its channel is quiescent.

14. A pulse code modulation system having a plurality of communication channels and including transmitting terminal equipment in accordance with claim 1 and receiving terminal equipment, including a code group register for receiving the code groups of pulses, decoding means for decoding code groups of pulses which define signal samples, change discriminating means for discriminating between code groups of pulses that define channels becoming active and code groups of pulses that define channels becoming quiescent, a channel counter to register the identity of any channel which is defined by a code group of pulses directed to that counter, means connected to said code group register, to said decoding means, to said change discriminating means and to said channel counter for directing code groups of pulses which define signal samples from said code group register to said decoding means and for directing code groups of pulses which define channels becoming active and quiescent from said code group register to said channel counter and said change discriminating means, a plurality of channel outputs, one for each channel, channel register means to indicate which channels are in active use and which channels are quiescent, and a channel selector which is connected to said channel outputs, said decoding means and said channel register means for selectively connecting said decoding means to the channel outputs of channels indicated as active by said channel register means one at a time in a predetermined order whereby signal samples from said decoding means are directed to the relevant channel outputs and which also is connected to said channel counter and sand change discriminating means to facilitate the selective control by said change discriminating means of the indication provided by said channel register means in respect of any channel identified in said channel counter as the result of a received code group of pulses which is directed to that counter and that discriminating means.

References Cited by the Examiner

UNITED STATES PATENTS

| | | | |
|---|---|---|---|
| 2,935,569 | 5/1960 | Saal et al. | 179—15 |
| 2,957,949 | 10/1960 | James et al. | 179—18.9 |

DAVID G. REDINBAUGH, *Primary Examiner.*

ROBERT L. GRIFFIN, *Examiner.*